Figure 1:
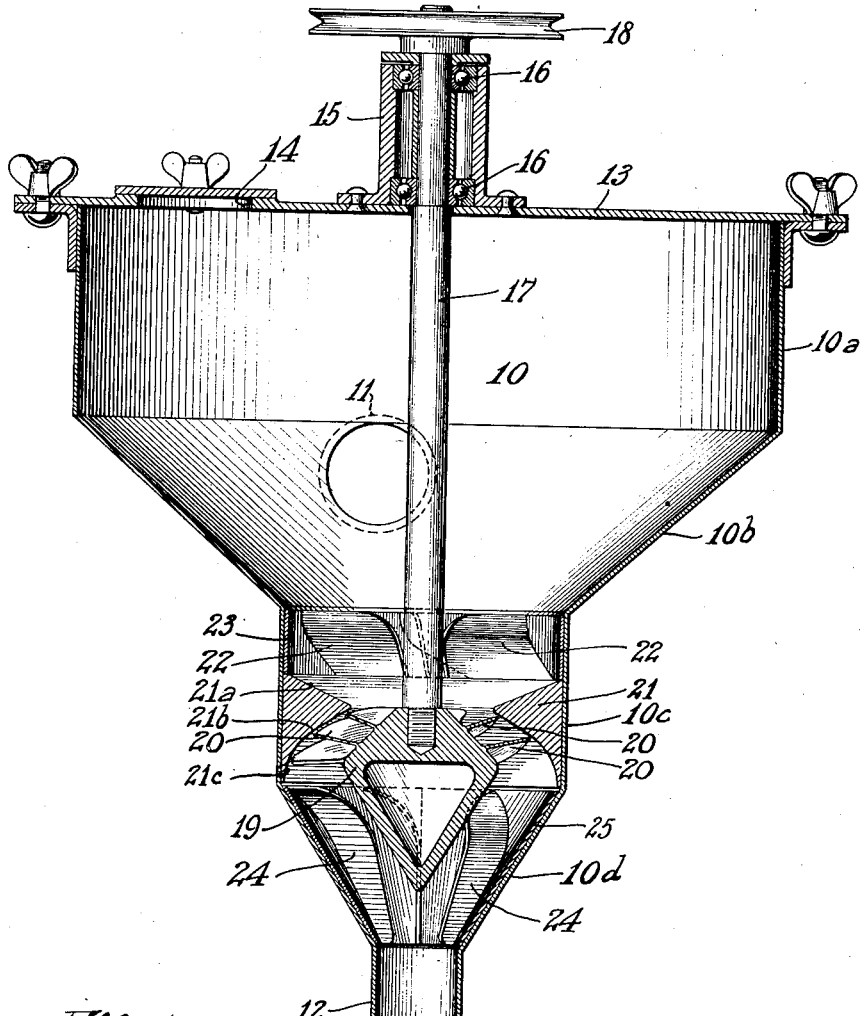

March 10, 1931.  G. F. WILSON  1,795,588
IMPELLING APPARATUS
Filed Oct. 13, 1927  2 Sheets-Sheet 2
Fig. 2.
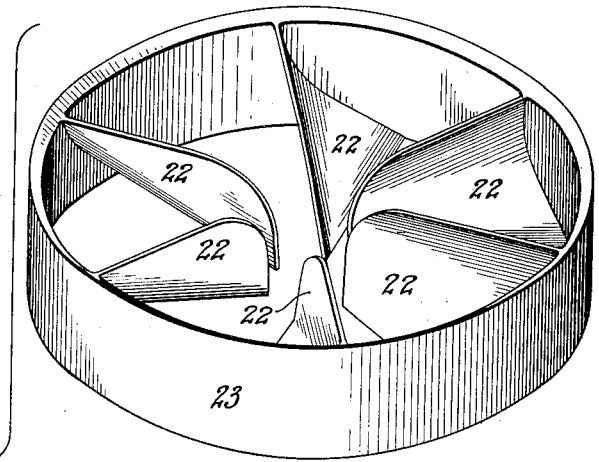
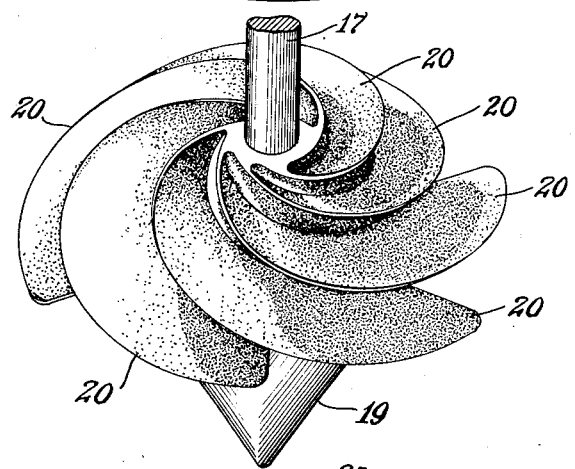
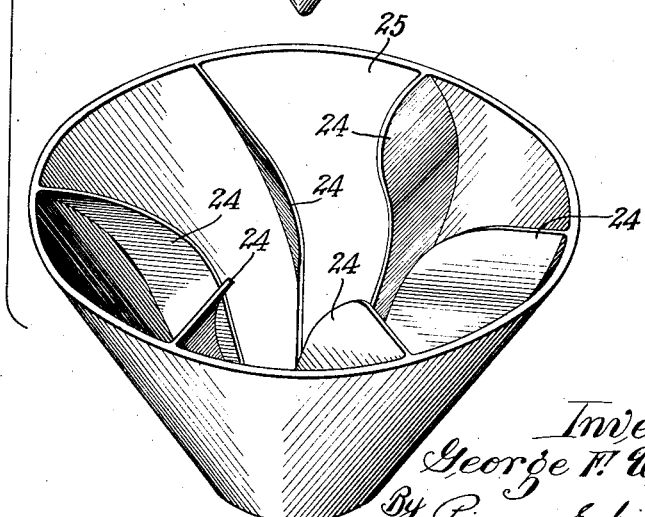
Inventor
George F. Wilson
By Pierson, Eakin & Avery
Attys.

Patented Mar. 10, 1931

1,795,588

UNITED STATES PATENT OFFICE

GEORGE F. WILSON, OF AKRON, OHIO, ASSIGNOR TO THE B. F. GOODRICH COMPANY, OF NEW YORK, N. Y., A CORPORATION OF NEW YORK

IMPELLING APPARATUS

Application filed October 13, 1927. Serial No. 225,979.

This invention relates to impelling apparatus, and more particularly to apparatus for impelling aqueous dispersions embodying constituents of different specific gravities which constituents will flocculate or agglomerate under certain conditions, such as immoderate agitation or from impact shock.

In manufacturing processes employing aqueous rubber dispersions, for example, natural rubber latex admixed with various other ingredients in a finely divided state, whether for spraying, dipping, suction, or the cataphoretic deposition of the rubber therein, it is necessary, to obtain the best results, that the liquid maintain a uniform composition throughout the duration of the process, and that the lighter constituents be prevented from floating on the top of the liquid, called creaming, and that the heavier constituents be prevented from depositing at the bottom of the processing receptacle, called sedimentation.

In order to maintain the uniform composition of the dispersion and to counteract creaming and sedimentation, it is preferred practice in manufacturing systems employing liquid dispersions to maintain a movement of the liquid upwardly through the processing receptacle from the zone where the constituents of highest specific gravity separate out and precipitate, toward the zone where the constituents of lower specific gravity separate out and float.

This result is effected by a circulatory system which withdraws the liquid from at and subjacent the liquid level of the processing receptacle, and returns it thereto at the bottom thereof, preferably through a plurality of inlet ports. The circulatory system includes impelling means for forcing the liquid into the bottom of the processing receptacle against the static head of the liquid therein, the liquid from the top of the receptacle flowing to the impelling means by gravity.
Inasmuch as ordinary pumps and the like cannot be used with colloidal dispersions, since they would cause flocculation or agglomeration, and as a propeller screw cannot work at sufficiently high speed to furnish the requisite rate of circulation of the liquid dispersion without causing flocculation or agglomeration, it is necessary, and is the chief object of this invention, to provide special impelling apparatus which is adapted to reduce the shock phenomena to the minimum and to provide the requisite rate of flow to the liquid dispersion.

Apparatus especially suitable for carrying out my invention is illustrated in the accompanying drawings in which:

Fig. 1 is a transverse vertical section of apparatus embodying my invention, in its preferred form; and Fig. 2 is a perspective view of some associated parts of the apparatus.

Referring to the drawings, 10 is a receptacle which is mounted in a circulatory system for liquid dispersions at an elevation which permits liquid to flow thereinto by gravity through an inlet pipe 11, an outlet pipe 12 being provided through which the liquid is forced in its return to the processing receptacle after being impelled by the apparatus constituting this invention.

The receptacle 10 comprises a cylindrical portion $10^a$, a frusto-conical portion $10^b$ depending therefrom, a cylindrical portion $10^c$ of smaller diameter depending from the latter, and a frusto-conical portion $10^d$ depending from the cylindrical portion $10^c$ and terminating in the outlet pipe 12. The inlet pipe 11 enters the receptacle 10 in its frusto-conical portion $10^b$ preferably slightly above the normal liquid level of the latter and somewhat tangentially thereto for a purpose presently to be explained.

The top of the receptacle 10 is provided with a cover 13 which is formed with an aperture 14 through which additional liquid may be introduced into the system, said cover also furnishing support for an axial journal-box 15 and bearings 16, 16 which support a downwardly extending vertical shaft 17. The upper end of the latter is provided with a belt-pulley 18 by which it may be driven from any suitable source of power (not shown).

Upon the lower end of the shaft 17 is mounted a feed-screw or impeller, generally designated 19, which has a body portion tapered at both ends similar to a pair of reversed cones with the upper cone truncated, a plurality of blades 20, 20 being formed on or secured to the upper portion of the impeller body, the face of which is frusto-conical, and which diverges in the direction of the flow of the liquid as also does the plane described by the free edges of the several blades, the latter being wider at their trailing ends than at their leading ends, and the pitch of the blades progressively decreasing toward their trailing ends. The number of blades and the pitch of the blades are such as to produce the most efficient results with a determinate speed of rotation of the shaft 17, and said speed of the shaft is determined by the character of the liquid being treated, to avoid detrimental shocks between said liquid and impeller blades. Therefore, although I have illustrated an impeller having six blades, it will be understood that I do not limit myself to this number but may use impellers of the character described having a greater or lesser number of blades as conditions may require. The lower conical portion of the impeller body 19 serves as fairing to give the impeller a generally stream-line shape, and thus prevents eddies in the liquid impelled by the blades 20 after passing the same.

A characteristics feature of this invention is that the liquid is caused to enter and leave the impeller to a small extent in a radial direction, but mainly in an axial direction. This is effected by an annular guider or housing structure 21 which is mounted in the cylindrical portion $10^c$ of the receptacle 10 concentric with the shaft 17, the upper face $21^a$ of said housing being tapered or converged downward toward its axial aperture, and the lower face $21^b$ thereof being reversely tapered or diverged from said aperture to a point adjacent its lower margin where it is curved downward as shown at $21^c$ so as to be substantially parallel to the impeller axis at its outlet or lower marginal portion. The taper of the face $21^b$ is greater than that of the frusto-conical upper portion of the impeller body 19 so that the fluid passage between them progressively increases in width as well as in diameter.

The meeting plane of the aforesaid tapered surfaces, in which is the axial aperture or inlet to the housing, is disposed substantially flush with the top of the impeller, and the diverging lower face of the housing is disposed close to the outer margins of the impeller blades 20. The arrangement is such that the liquid dispersion passes through the housing inlet and enters the impeller in an axial direction, passes between the blades thereof with a rotary movement in a radial as well as in an axial direction, and issues from the impeller again in an axial direction but over a greater area and at less velocity than at the housing inlet, thus creating a velocity head of liquid at the housing inlet and a pressure head at the housing outlet.

The diverging face $21^b$ of the housing member is so shaped that the radial flow of the liquid, due to centrifugal force in its rotary movement set up by the rotation of the blades 20 and the frusto-conical shape of the upper portion of the impeller body 19, is not repressed or completely obstructed but is permitted substantial freedom by the said diverging shape of the housing-face $21^b$, which is disposed substantially parallel to the direction of fluid flow, to a point adjacent the outlet of the latter, where it is gently diverted in an axial direction by the arcuate terminal $21^c$ portion of said face. The diverging shape of the housing face $21^b$ also obviates direct impact by the liquid, and avoids compressive action upon the latter between the impeller and housing structures. Being disposed close to the impeller blades, the housing prevents retrogressive flow of the liquid particularly at the outlet where the pressure is high and velocity low.

In order to obviate impact between the downwardly moving liquid and the impeller structure as the liquid enters the latter, said liquid is given an initial rotary flow or drift, in the direction of the impeller's rotation, by means of a radial series of deflector-blades or vanes 22, 22, secured at their outer ends upon an annular support 23 which is positioned within the cylindrical portion $10^b$ of the receptacle 10 immediately above the impeller 19 and housing 21, the inner ends of the vanes lying adjacent the shaft 17. As will be seen in Fig. 2, the vanes 22 are transversely arcuate at their outer ends and substantially flat at their inner ends so as to produce a normal rotary drift with greatest surface speed at its outer periphery.

It is desirable that said rotary drift be imparted to the liquid dispersion immediately before it enters the impeller structure, but that the drift should not extend to the remainder of the liquid in the upper portion of the receptacle, and it is for this reason that the inlet pipe 11 is disposed tangentially of the conical portion $10^b$ of the receptacle 10 and at the proper angle so that the head of the inflowing liquid will counteract any tendency of the upper level of the liquid to drift caused by the detector vanes 22. The position of the inlet 11 above the liquid level of the receptacle insures sufficient movement on the surface of the latter to prevent skin formation on the dispersion.

To subdue any rotary drift in the liquid as it leaves the delivery side of the impelling apparatus, radial deflector vanes 24, 24 are positioned within the conical zone $10^d$ of the receptacle 10 adjacent the conical lower end of the impeller 19, said vanes 24 being secured at their respective outer margins to a frusto-conical supporting structure 25 which is seated within the conical zone 10ᵈ. As shown in Fig. 2 the upper end portions of the vanes 24 are curved and their lower end portions straight or parallel to the axis of the impeller, the arrangement being such that any rotary drift in the liquid as it comes from the impeller is subdued by the said vanes, and the liquid flows in an axial direction from the bottom of apparatus into the outlet pipe 12. The diameter of the latter is much smaller than the outlet between the impeller 19 and its housing 21 so that the pressure head thereat becomes a velocity head at the outlet pipe 12.

The deflector vanes 22 and 24 are not a part of the present invention and are described only to give a clearer conception of the operation and function of the apparatus.

By the above described means it is possible to effect the required flow of the liquid dispersion and to maintain the uniform composition of the liquid without interfering with the colloidal condition of the constituents of the dispersion.

Although the invention is particularly applicable for use with rubber dispersions it will be understood that it is in no way restricted thereto but may be used with other liquids and under other conditions where efficient and smooth flow of the liquid without agitation is desired.

The principles of the impeller may well be used in propellers for air and water craft, wherein its enlarged stream-lined hub portion replaces the inner ends of the propeller blades, which ends do practically no work in the propelling of the craft due to their relatively slow surface speed.

My invention is susceptible to modification within the scope of the appended claim.

I claim:

Impelling apparatus comprising a rotatable fluid-feed screw having a frusto-conical body-portion diverging in the direction of flow, and blades of progressively increasing width helically positioned on the diverging body portion, an annular housing closely surrounding the rotatable screw, and a plurality of stationary curved vanes adapted to arrest the rotation of the liquid issuing from the screw and direct it without eddying to the outlet.

In witness whereof I have hereunto set my hand this 7th day of October, 1927.

GEORGE F. WILSON.